United States Patent [11] 3,582,006

| [72] | Inventor | Earl Clayton Thompson<br>Rt. 2, Box 453, Waco, Tex. 76710 |
|---|---|---|
| [21] | Appl. No. | 820,237 |
| [22] | Filed | Apr. 29, 1969 |
| [45] | Patented | June 1, 1971 |

[54] DRINKING VALVE FOR POULTRY AND LIVESTOCK
10 Claims, 12 Drawing Figs.

[52] U.S. Cl. .................................................. 251/146, 119/72.5, 251/303
[51] Int. Cl. .................................................. A01k 7/00
[50] Field of Search .......................................... 119/72.5, 75; 251/239, 146, 303

[56] References Cited
UNITED STATES PATENTS
2,710,594 6/1955 Thompson .................... 251/339X
2,874,996 2/1959 Zajac .......................... 251/339X
3,010,478 11/1961 Buck et al. .................... 251/146X
FOREIGN PATENTS
704,993 3/1965 Canada ........................ 119/72.5

Primary Examiner—M. Cary Nelson
Assistant Examiner—Michael O. Sturm
Attorney—Cecil L. Wood ABSTRACT: A valve for dispensing water from flow lines connected in a water distribution system for poultry and livestock, preferably formed of plastic materials, and having a spring-biased stem normally seated against the passage of water through the valve but having means thereon enabling an individual fowl or animal to actuate the stem to unseat it to dispense water as required, the stem being capable of both longitudinal and lateral displacement from its seat. A bowl may also be embodied in the invention for the service of animals.

PATENTED JUN 1 1971
3,582,006
SHEET 1 OF 2
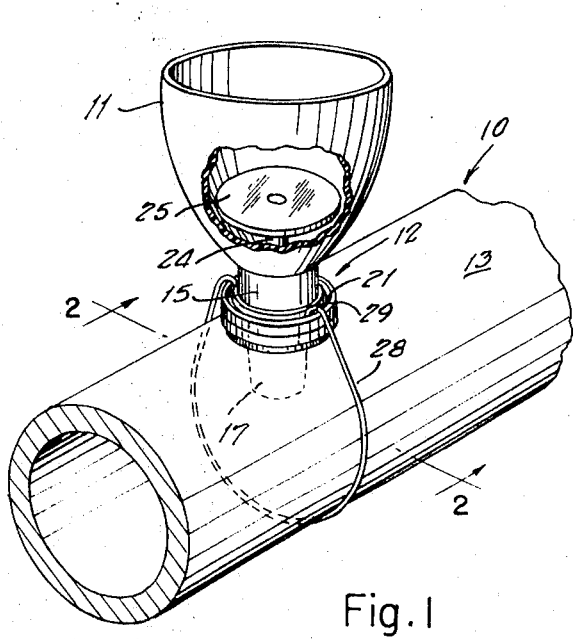
Fig.1
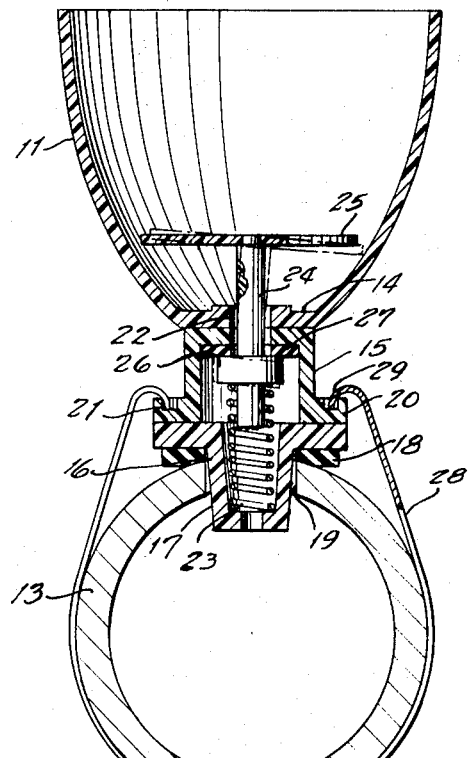
Fig.2
Fig.3
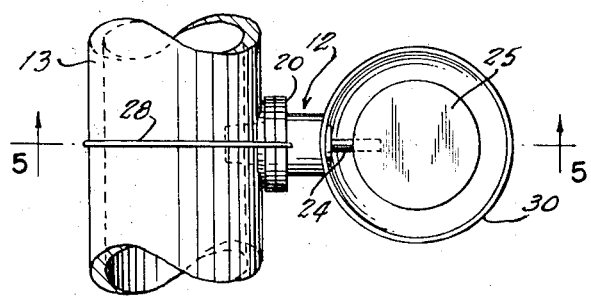
Fig.4
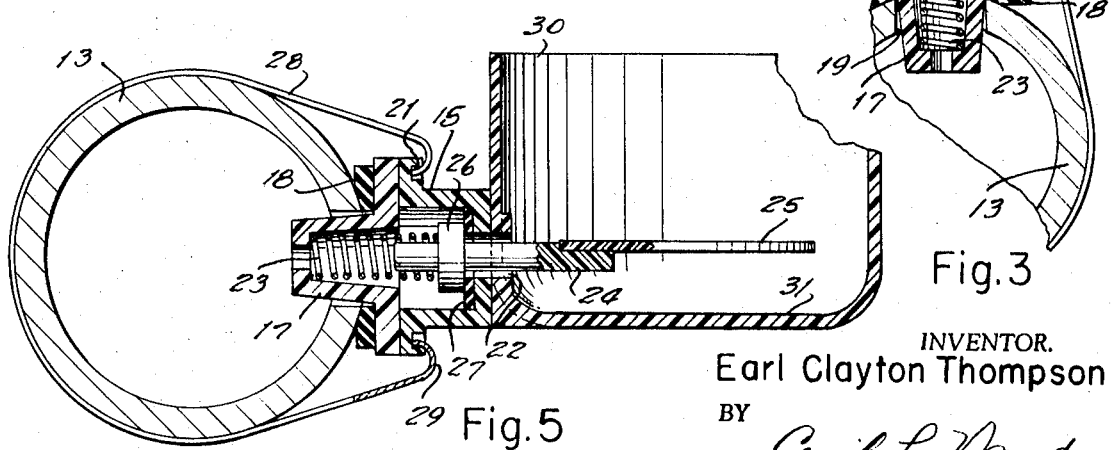
Fig.5
INVENTOR.
Earl Clayton Thompson
BY
Cecil L. Wood
ATTORNEY

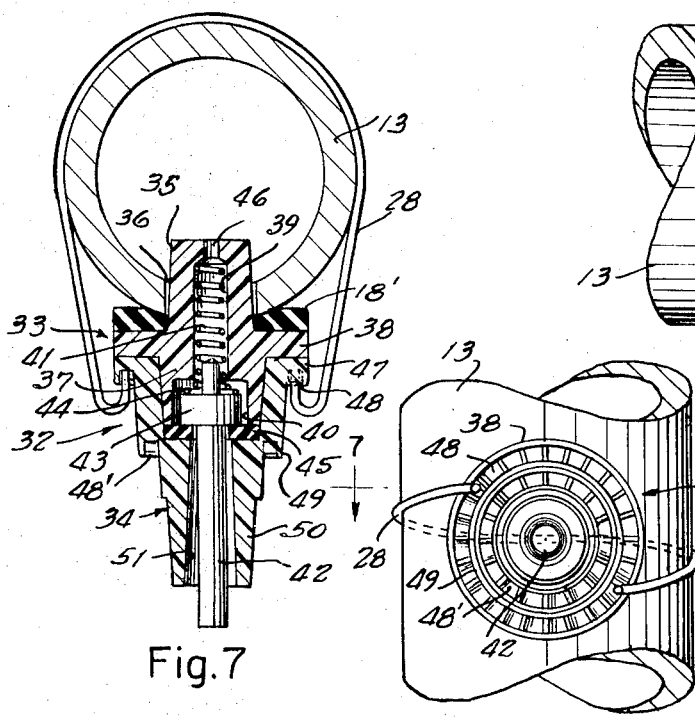
Fig.7
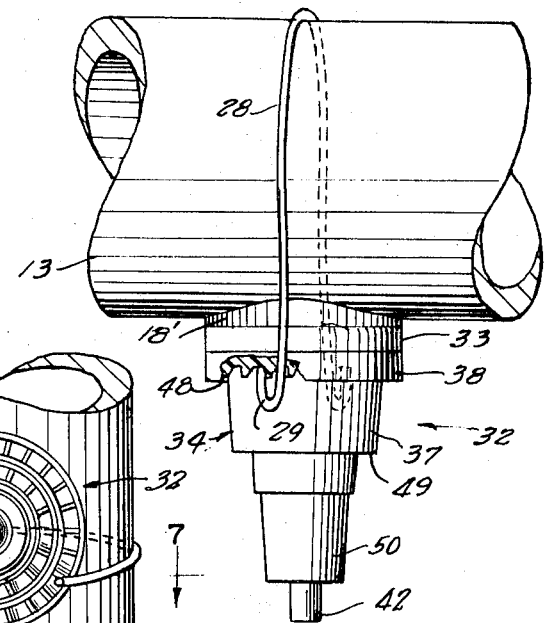
Fig.8
Fig.6
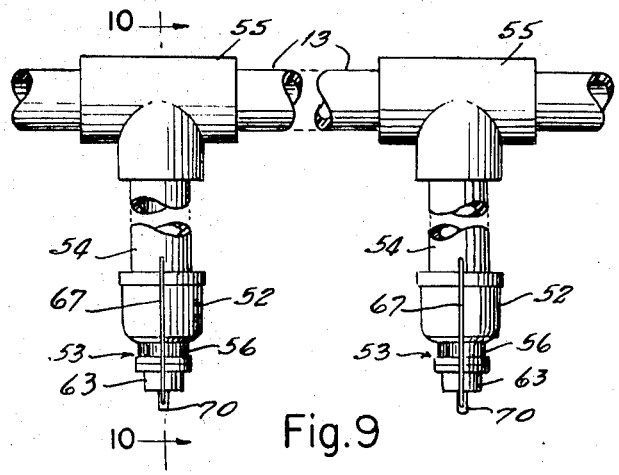
Fig.9
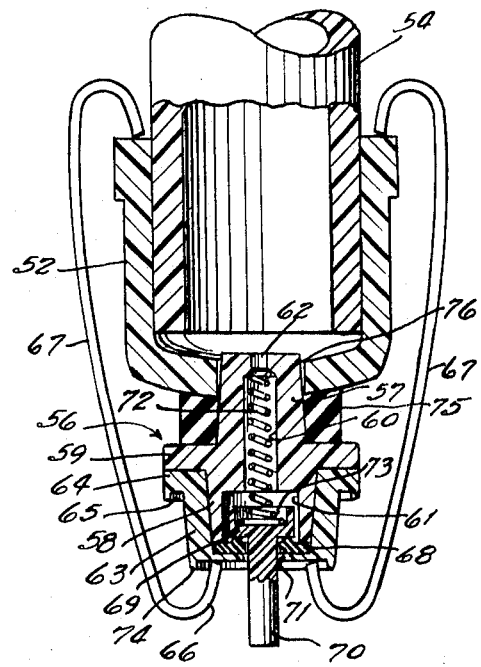
Fig.10
INVENTOR.
Earl Clayton Thompson
BY Cecil L. Wood
ATTORNEY
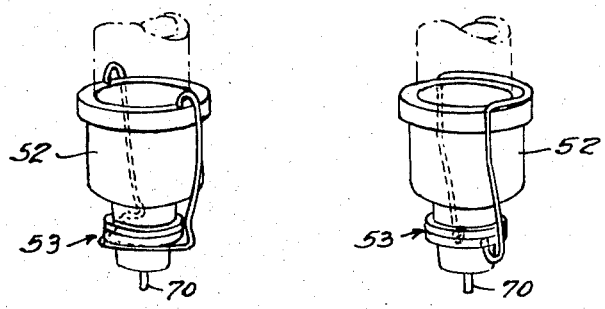
Fig.11    Fig.12

DRINKING VALVE FOR POULTRY AND LIVESTOCK

BACKGROUND OF THE INVENTION

The present invention is related to a Poultry Drinking Valve described in my U.S. Pat. No. 2,710,594, dated June 14, 1955.

SUMMARY

This invention relates to water dispensing systems for poultry and livestock, and more particularly to a valve capable of actuation by an individual fowl to release water therethrough as needed.

A prime object of the invention resides in the provision of a valve of simple design adapted to be attached at desired spacings along water distribution lines connected to a source, and having a spring-biased stem formed with a seating element thereon to close the valve, and means on the operative end of the stem to enable an individual fowl or animal to depress or laterally displace the seating element to dispense the required quantity of water.

Another object of the invention is that of providing a water-dispensing valve which may be formed of plastic materials, and in certain applications may have a bowl or receptacle thereon to receive a quantity of water dispensed through the valve to be consumed according to the individual requirements.

A further object of the invention is that of providing means by which the valve can be detachably secured to a water conduit, whether formed of metal or plastic, and at any desired spacings therealong, and arranged to dispense water therefrom in a vertical or horizontal position.

Broadly, the invention contemplates the provision of a valve in which the stem is arranged in such manner as to enable it to be displaced longitudinally or laterally against the tension of a light spring whereby only slight pressures are required to open the valve to dispense water while yet capable of being completely closed against involuntary leakage.

DESCRIPTION OF THE DRAWINGS

While the foregoing objects are paramount, other and lesser objects will become apparent as the description proceeds when considered in connection with the appended drawings wherein:

FIG. 1 is a perspective view of one embodiment of the invention, including a bowl shown partially broken away to expose the disc on the stem, and showing a fragment of a water conduit to which the valve is removably attached.

FIG. 2 is a vertical sectional view, on line 2—2 of FIG. 1, showing the interior of the valve body, the spring-biased stem and seating element, and the stem-actuating disc within the bowl.

FIG. 3 is a fragmentary sectional view of the valve showing a modified clamp-attaching arrangement.

FIG. 4 is a plan view of a modified bowl structure, the valve being in a horizontal position on the conduit which is fragmentarily shown.

FIG. 5 is an enlarged sectional view, on line 5—5 of FIG. 4, showing the valve in a horizontal position with a modified bowl structure.

FIG. 6 is a top plan view of still another modification of the present invention.

FIG. 7 is a cross-sectional view taken approximately along line 7—7 of FIG. 6.

FIG. 8 is a side elevational view of the structure shown in FIGS. 6 and 7, with a part thereof being broken away.

FIG. 9 is a fragmentary side elevational view of a further modification of the present invention, as utilized in a water system along a water conduit.

FIG. 10 is an enlarged cross-sectional view taken along line 10—10 of FIG. 9.

FIG. 11 illustrates one form of attaching clip for securing the valve shown in FIG. 9, and FIG. 12 is a modification of the clamping device shown in FIG. 11.

It is generally known that chickens, and other domestic fowl, especially baby chicks, are attracted to luminescent objects, such as droplets of water on transparent or translucent plastic materials, and for this reason it is desirable that the valve and stem be formed of such materials. The structure of the valve, as will become apparent, particularly the structure shown in FIGS. 6 to 12, being readily capable of operation by the relatively light touch such as the peck of a baby chick or other young fowl. The luminous glow of a droplet of water on the valve stem tends to attract the fowl and incite sufficient curiosity to continue the procedure to satisfy its thirst.

FIG. 1 fragmentarily shows a portion of a low-pressure water distribution system 10 which includes an open bowl 11 affixed to a valve 12 which meters water from a water-carrying conduit 13. As best shown in FIG. 2, the bottom 14 of the bowl is rigidly affixed to a valve body, as by cementing, which latter is comprised of opposed first and second valve body members 15 and 16, respectively. A depending portion 17 of the body member 16 extends through a resilient washer 18 and into the conduit 13 through an aperture 19 therein.

The upper portion 15 of the valve body is inverted cup shaped, having a circumferential flange 20 formed about its open end which is joined to the portion 16 and has an annular groove 21 formed in its outer surface. The closed end of the member 15 is apertured, as also the bottom 14 of the bowl 11, defining a flow passage 22. The depending portion 17 of the body member 16 is slightly tapered and defines a receptacle for a spring 23 which embraces the lower end of a valve stem 24 arranged concentrically through the passage 22.

The stem 24 has a disc element 25 attached to its upper end within the bowl 11, and a seating element 26 is formed on the stem 24 within the body member 16 and is adapted to engage a resilient seat 27 in the member 16 under the influence of the spring 23 to close the passage 22, as best shown in FIG. 2. A wire clamp 28 secures the valve assembly, with the bowl 11, to the conduit 13, the hooks 29 thereof engaging the groove 21.

The concentric arrangement of the stem 24 in the passage 22, and the resilience of the spring 23 thereon, will enable the stem and its disc member 25 some lateral movement when acted upon by a drinking fowl to displace the seating element 26 from its seat 27, as indicated by the broken lines in FIG. 2.

FIG. 3 illustrates a valve 12' which is identical to the valve shown in FIGS. 1 and 2 in many respects, with the exception that a dual arrangement of annular grooves 21' are provided on the body member 16 corresponding to the groove 21 in order to enable the clamp 28 to secure the valve body to conduits of varying diameters.

Similar or like reference numerals will apply to similar or like elements, wherever practical to do so, throughout the remainder of the description.

FIGS. 4 and 5 illustrate a modified structure, and includes the valve 12 disposed in a horizontal plane, the disc element 25 being attached to the stem 24 in the axial plane thereof and within a modified bowl 30 with which the outlet passage 22 communicates on one side near the bottom 31. The assembly is secured to a conduit 13 in the same manner as in the structure shown in FIGS. 1 and 2.

In the embodiment illustrated in FIGS. 6—8 the valve body 32 is composed of upper and lower members 33 and 34, the former having a slightly tapered portion 35 which extends through an aperture 36 into a conduit 13, and a similar lower portion 37 depending from a flange 38 against which is seated a resilient washer 18' by which a seal is provided about the aperture 36 in the conduit 13. A concentric bore 39 is formed in the member 33 having an enlarged counterbore 40 at its lower end to accommodate a spring 41 whose lower end embraces the upper end of a valve stem 42 having a seating element 43 formed thereon within the counterbore 40. The lower end of the spring 41 has expanded coils 44 which bear against the seating element 43 and retains it against its seat 45 in the lower body member 34. An aperture 46 is provided in the upper end of the tapered portion 35 of the member 33 affording communication between the conduit 13 and the counterbore 40.

The lower body member 34 is also slightly tapered and fitted over the depending portion 37 of the member 33, as best shown in FIG. 7, and has a flange 47 which abuts and is attached to the flange 38 of the member 33. The lower surface of the flange 47 is formed with a compartmented annular groove 48 whose function is to receive the hooks 29 of the clamp 28 in selected compartments, as shown in FIG. 6, whereby to secure the valve assembly to the conduit 13 and, by twisting the assembly, to adjust the tension of the clamp 28, in the manner shown in FIGS. 6 and 8. An additional groove 48' is formed about a shoulder 49 on the depending portion 50, of the body member 34 and spaced downwardly from the flange 47, to enable the use of a clamp of greater length or to enable the assembly to be applied to a conduit of lesser diameter.

As apparent in FIG. 7, the water passage 51 formed in the depending portion 50 of the body member 34 is flared downwardly toward the outlet end to enable the lower end of the stem 42 to have greater lateral movement when acted upon by a fowl. The elongated extension of the stem 42 provides for greater leverage so that the seating element 43 thereof can be more readily displaced from its seat 49.

The modified structure shown in FIGS. 9 to 12, inclusive, includes a cup shaped coupling 52 connected to the modified valve 53 by which the latter is attached to the outer end of a nipple 54 connected through a T-fitting 55 to a conduit 13, as indicated in FIG. 9, at predetermined spacings.

The valve 53 is similar to those shown in FIGS. 6, 7 and 8 differing in the construction of the lower body member. The valve comprises an upper member 56 having upper and lower tapered portions 57 and 58 projecting from an annular flange 59, a central water passage 60 being formed concentrically of the upper portion 57 terminating in a cavity 61 in the lower portion 58 and having an orifice 62 in the upper end of the passage 60.

The lower body member 63 of the valve 53 is cup shaped and is conformably fitted over the lower tapered portion 58 of the upper member 56, enclosing the cavity 61, a flange 64 being formed about its upper rim which joins the flange 59 and has an annular groove 65 formed in its outer surface to receive the hooks 66 of clamp members 67, as shown in FIG. 12. A resilient washer 68 is arranged in the bottom of the member 63 which provides a seal between it and the member 56 and a seat for the seating element 69 on a stem 70 which depends through an aperture 71 in the bottom of the member 63, the seating element 69 being enclosed within the cavity 61. A spring 72 is arranged in the water passage 60 and is seated at its lower end, which has expanded coils in a recess 73 in the seating element 69.

The undersurface of the lower body member 63 is recessed to define a bead 74 therearound to retain the hooks 66 of the clamp members 67 alternately with the groove 65, as desired, in the manner shown in FIGS. 9 and 10.

The upper tapered portion 57 of the upper body member 56 of the valve is embraced by a resilient washer 75 and has its upper end inserted through an aperture 76 in the bottom of the coupling 52 which is fitted over the end of the nipple 54, the washer 75 providing a seal between the coupling 52 and the valve. The clamp members for attaching the valve to a conduit may be of any desired form, such as shown in FIGS. 11 and 12.

OPERATION

The operation of the embodiment of the invention shown in FIGS. 1 to 5 results when a chicken pecks at the disc 25 located within the bowl, thus moving the disc and valve stem to the position indicated by the broken lines, whereupon the valve element will be upset from its seat to enable water to flow from the interior of the conduit into the bowl to maintain a constant water level therein approximating the level of the disc element. As the water level recedes from the disc, the fowl will soon learn to peck on the upper surface of the disc in order to replenish the water supply.

In the embodiment shown in FIGS. 6 through 12, the fowl will peck in the vicinity of the lowermost portion of the valve body, thereby moving the valve stem vertically or laterally to cause water to accumulate within the flow passage through the valve body. Surface tension of the water will cause large droplets to cling to the peripheral surface of the stem and lower portions of the valve body to provide an accumulation of water. As the accumulated water is depleted, the fowl will peck at the lowermost portion of the valve, thereby replenishing the water supply. A thirsty fowl that has not become accustomed to drinking from the fountain will observe an occasional droplet of water left clinging thereto, and upon pecking at this droplet of water the fowl will soon discover how to obtain relief from its thirst.

A plurality of valve bodies are easily assembled in spaced relationship along the length of an apertured plastic conduit by merely inserting the assembled valve and seal, after which the depending hooks of the clamp are placed into one of the grooves provided on the valve flanges which may be spaced to permit the use of a single clamp in the application of the valve to pipe of varying diameters.

What I claim is:

1. In a poultry-actuated drinking valve for connection in a water supply conduit
   a housing comprising axially aligned inner and outer portions having an axial passageway therethrough; said passageway being defined by inner and outer axially aligned bores communicating with an intermediate radially enlarged chamber; said housing portions defining respectively a mating recess and boss for axially aligning said portions; said passageway chamber being formed between said housing portions;
   annular valve seat means defined in said outer housing portion by the outer wall of said chamber surrounding said outer bore; a valve closure member including a seating element for engagement with said valve seat means and an axial stem extending through and projecting from said housing outer bore; spring means disposed in said housing for urging said closure-seating element against said seat means; said passageway outer bore being dimensioned to permit lateral movement of said closure stem, and accompanying rocking of said closure-seating element, to open said valve;
   said inner housing portion having an axially extending boss at its inner end adapted to be received in an aperture in a water supply conduit wall, and defining an annular bearing shoulder surrounding said conduit boss for engagement with the conduit wall; said passageway inner bore extending through said conduit boss;
   said outer housing portion having outward facing latching recess means;
   and resilient clamp means for engaging a water conduit and including hooks for latching engagement with said latching recess means for operatively connecting said valve with the water conduit.

2. A drinking valve as set forth in claim 1
   including a resilient annular gasket disposed on said bearing shoulder for sealing engagement with the conduit wall.

3. A drinking valve as set forth in claim 1
   wherein said valve spring is a helical spring having radially expanded coils at its outer end to enable biasing force to be exerted on said sealing element at a location radially spaced from its central axis.

4. A drinking valve as set forth in claim 1
   wherein said inner housing portion includes said mating boss; and wherein said passageway chamber is formed in said mating boss, with the walls of said chamber defining an annular sealing lip.

5. A drinking valve as set forth in claim 4
   including a resilient annular washer disposed on the outer wall of said housing chamber and defining said valve seat means; and said housing sealing lip engaging said washer to seal said housing portions.

6. A drinking valve as set forth in claim 1 wherein said latching recess means is defined by an outward facing annular shoulder having an annular groove.

7. A drinking valve as set forth in claim 1 wherein said latching recess means is defined by at least two axially spaced outward facing annular shoulders each having an annular groove, for selective engagement by said resilient clamp means.

8. A drinking valve as set forth in claim 1 wherein said latching recess means is defined by an annular outward facing shoulder having circumferentially spaced outward facing recesses.

9. In a poultry-actuated drinking valve for connection in a water supply conduit, comprising, a valve body having first and second members, one of said members being hollow and the other said member having a portion receivable in said hollow member, an outer peripheral flange on each member having surfaces for opposing abutment when said members are joined, the said members having axially aligned passages therethrough and a cavity formed in one of said passages, the said passages defining a common flow channel, the said flanges being joined in abutting relation to form a chamber with said cavity, an apertured resilient seat in said cavity, a valve stem operatively arranged in said flow channel and having a seating element thereon engageable with said resilient seat, a spring having expanded coils at its lower end arranged in the passage of one of said members for biasing said stem and its seating element against said resilient seat, the said stem having a portion extending axially through the passage in the other said member, a face of one of said flanges having a groove formed therein, a resilient clamp having means for engaging said groove for retaining said valve body on a water conduit, and sealing means between said valve and said conduit.

10. The valve of claim 9, including means forming a second groove superimposed above and spaced from the first-named groove, whereby said clamp can selectively engage either groove to thereby enable the clamp to affix the valve to more than one diameter of conduit.